No. 883,183.  
PATENTED MAR. 31, 1908.  
D. ELLIOTT & L. B. STANTON  
PROTECTIVE DEVICE FOR COOKING UTENSILS.  
APPLICATION FILED MAR. 26, 1907.

UNITED STATES PATENT OFFICE.

DAVID ELLIOTT AND LEMUEL B. STANTON, OF SAUGERTIES, NEW YORK, ASSIGNORS OF ONE-THIRD TO SAID ELLIOTT AND ONE-THIRD TO JACOB BRUCKNER, OF SAUGERTIES, NEW YORK, AND ONE-THIRD TO CARRIE D. B. NEARING, OF NEW YORK. N. Y.

PROTECTIVE DEVICE FOR COOKING UTENSILS.

No. 883,183.  Specification of Letters Patent.  Patented March 31, 1908.

Application filed March 26, 1907. Serial No. 364,633.

*To all whom it may concern:*

Be it known that we, DAVID ELLIOTT and LEMUEL B. STANTON, citizens of the United States, residing at Saugerties, in the county of Ulster and State of New York, have invented certain new and useful Improvements in Protective Devices for Cooking Utensils, of which the following is a specification, reference being had to the accompanying drawings.

Our invention relates to improvements in protective devices which are interposed between the bottom of a cooking utensil or the like and the source of heat, to protect the contents of the utensil from being overheated or scorched; and an object of our invention is to provide a protective device of this character which will prove simple in construction, cheap in manufacture and efficient in operation.

Figure 1:
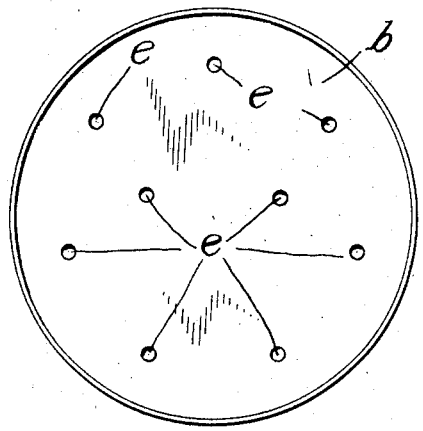
Figure 2:
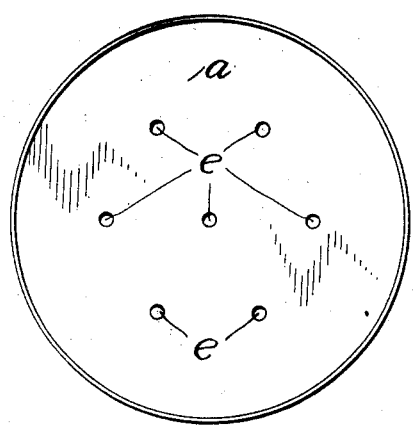
Figure 3:
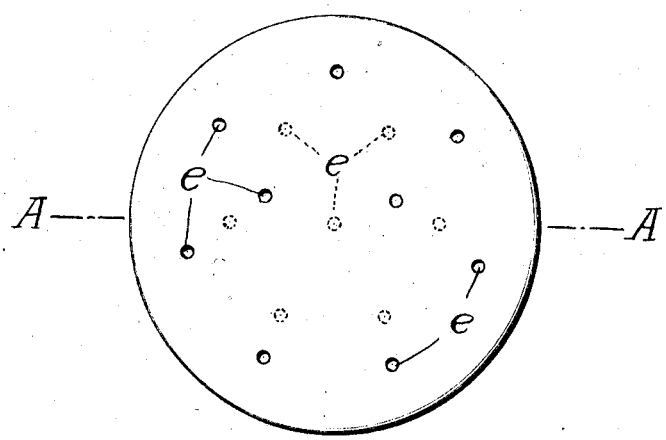
Figure 4:
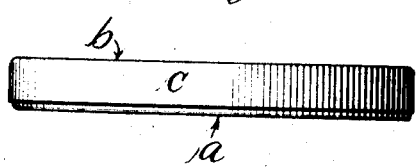
Figure 5:
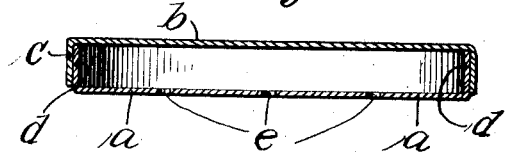

In the drawings illustrating the principle of our invention and the best mode now known to us of applying that principle, Figure 1 is a plan view of the cover; Fig. 2 is a similar view of the base member; Fig. 3 shows in plan the members assembled; Fig. 4 is a side view of what is shown in Fig. 3; and Fig. 5 is a section on the line A A Fig. 3.

The device consists of two principal parts, the bottom member *a*, and the upper member or cover *b*. The latter is formed with the side wall or flange *c*, which fits snugly over the side wall or flange *d*. Each member is formed with apertures *e*, the apertures of the member *a* being "staggered" with relation to the apertures in the cover member *b*; or, as it may be termed, out of register therewith.

This device is placed under the bottom of the cooking utensil and serves to interpose a volume of air between the cooking utensil and the source of heat; and this volume of air serves to protect the contents of the cooking utensil from being scorched. By providing the device with a cover, and forming apertures in both the bottom and the top of the device, the heat is directed towards the bottom of the utensil so that the efficiency of the heating device is not lowered and yet at the same time a protection is afforded against overheating.

It will be distinctly understood that our new protective device is in no sense a vessel or cooking device designed and adapted for the reception of foods to be cooked. On the contrary the device is shallow and of slight capacity, so that the cooking utensil may not be held far from the source of heat. Hence, the top of the cover is brought close to the bottom of the base member so that the layer of air (or air space) between the two is thin, as is shown in the drawings. Further, the base of the device rests directly upon the source of heat and is not separated therefrom by any flange, as is common in cooking utensils proper.

We claim:

As a new article of manufacture, a protective device of the character described consisting of a dish-like lower member of sheet metal formed with an integral upwardly-turned flange; and a sheet metal cover for said member; said sheet metal cover being formed with an integral downwardly-extending flange which fits snugly over said upwardly-turned flange; the top and bottom of said device being formed with apertures which are out of register or staggered with relation to one another.

Signed in the presence of the two undersigned witnesses at said Saugerties this 22nd day of March, 1907.

DAVID ELLIOTT.
LEMUEL B. STANTON

Witnesses:
ERNEST HASSINGER,
HELEN C. KEENAN